(12) United States Patent
Miller et al.

(10) Patent No.: US 9,327,732 B1
(45) Date of Patent: May 3, 2016

(54) METHOD AND ASSEMBLY FOR CHANGING THERMAL ENERGY LEVELS IN A VEHICLE BY ADJUSTING ENGINE BRAKING

(71) Applicant: FORD GLOBAL TECHNOLOGIES, LLC, Dearborn, MI (US)

(72) Inventors: Kenneth James Miller, Canton, MI (US); Douglas Raymond Martin, Canton, MI (US); William Paul Perkins, Dearborn, MI (US); Daniel Mark Schaffer, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/739,401

(22) Filed: Jun. 15, 2015

(51) Int. Cl.
| | | |
|---|---|---|
| *B60W 30/18* | (2012.01) | |
| *B60W 10/184* | (2012.01) | |
| *B60W 10/196* | (2012.01) | |
| *B60W 10/10* | (2012.01) | |
| *B60W 10/30* | (2006.01) | |
| *B60W 40/107* | (2012.01) | |
| *B60W 10/02* | (2006.01) | |
| *B60W 10/119* | (2012.01) | |

(52) U.S. Cl.
CPC ......... *B60W 30/18136* (2013.01); *B60W 10/02* (2013.01); *B60W 10/10* (2013.01); *B60W 10/119* (2013.01); *B60W 10/184* (2013.01); *B60W 10/196* (2013.01); *B60W 10/30* (2013.01); *B60W 40/107* (2013.01); *B60W 2510/18* (2013.01); *B60W 2520/105* (2013.01); *B60W 2530/14* (2013.01); *B60W 2710/025* (2013.01); *B60W 2710/1072* (2013.01)

(58) Field of Classification Search
CPC .................................. B60T 7/00; B60K 6/04
USPC ............................................................. 701/22
See application file for complete search history.

(56) References Cited

U.S. PATENT DOCUMENTS

| | | | | |
|---|---|---|---|---|
| 6,283,240 | B1 * | 9/2001 | Beever | B60K 6/485 180/178 |
| 6,312,065 | B1 * | 11/2001 | Freitag | B60G 17/0195 303/186 |
| 6,324,457 | B1 | 11/2001 | Minowa et al. | |
| 6,405,116 | B1 | 6/2002 | Koibuchi | |
| 6,421,599 | B1 * | 7/2002 | Lippa | B60H 1/3208 60/277 |
| 6,459,980 | B1 * | 10/2002 | Tabata | B60K 6/46 180/65.1 |
| 6,508,523 | B2 * | 1/2003 | Yoshino | B60K 6/48 303/152 |
| 7,672,770 | B2 * | 3/2010 | Inoue | B60L 15/2072 701/70 |
| 8,612,092 | B2 * | 12/2013 | Okamoto | B60H 1/00732 165/202 |
| 8,932,179 | B2 | 1/2015 | Banker et al. | |
| 2005/0200197 | A1 * | 9/2005 | Crombez | B60L 7/18 303/152 |

(Continued)

FOREIGN PATENT DOCUMENTS

JP        3870799     10/2006

*Primary Examiner* — Thomas Tarcza
*Assistant Examiner* — Alex C Dunn
(74) *Attorney, Agent, or Firm* — Carlson, Gaskey & Olds, P.C.

(57) ABSTRACT

An exemplary method includes adjusting a proportion of engine braking used to achieve a target deceleration of a vehicle to change an amount of thermal energy generated from engine braking. An exemplary assembly includes a friction brake to selectively provide friction braking to a vehicle, an engine brake to selectively provide engine braking to the vehicle, and a controller configured to adjust a proportion of the engine braking used to achieve a target deceleration of the vehicle to change an amount of thermal energy generated from engine braking.

21 Claims, 2 Drawing Sheets

(56) References Cited

U.S. PATENT DOCUMENTS

| | | | |
|---|---|---|---|
| 2006/0102394 A1* | 5/2006 | Oliver | B60K 6/12 180/65.24 |
| 2011/0208381 A1* | 8/2011 | Le Brusq | B60T 1/10 701/22 |
| 2011/0272230 A1* | 11/2011 | Sekiya | B60T 1/10 188/70 R |
| 2013/0304344 A1 | 11/2013 | Abe | |
| 2015/0057905 A1 | 2/2015 | Niwa et al. | |

* cited by examiner

US 9,327,732 B1

METHOD AND ASSEMBLY FOR CHANGING THERMAL ENERGY LEVELS IN A VEHICLE BY ADJUSTING ENGINE BRAKING

TECHNICAL FIELD

This disclosure relates generally to heating portions of a vehicle and, more particularly, to adjusting a proportion of engine braking used during a deceleration. The adjusting can be to, for example, provide thermal energy for heating powertrain components to improve fuel economy.

BACKGROUND

Decelerating a vehicle can involve applying a brake torque. The brake torque can include some brake torque from friction braking and some brake torque from engine braking. Friction braking decelerates the vehicle by converting kinetic energy into heat energy via friction brakes. The heat energy dissipates to the atmosphere. Engine braking decelerates the vehicle using the engine. Engine braking generates thermal energy that partially dissipates to an engine, transmission, or driveline mass (metal, coolant, oil). Adjusting the vehicle to a lower gear ratio can increase available engine braking.

SUMMARY

A method according to an exemplary aspect of the present disclosure includes, among other things, adjusting a proportion of engine braking used to achieve a target deceleration of a vehicle to change an amount of thermal energy generated from engine braking.

In a further non-limiting embodiment of the foregoing method, the adjusting increases the proportion of engine braking used during the deceleration.

In a further non-limiting embodiment of any of the foregoing methods, the method includes decreasing a proportion of friction braking during the adjusting.

In a further non-limiting embodiment of any of the foregoing methods, the method includes increasing the engine braking during the adjusting by adjusting a transmission gear ratio.

In a further non-limiting embodiment of any of the foregoing methods, the method includes increasing the engine braking during the adjusting by moving to an all-wheel drive mode of the vehicle.

In a further non-limiting embodiment of any of the foregoing methods, the method includes slipping a clutch during the adjusting to increase thermal energy in axle components of the vehicle.

In a further non-limiting embodiment of any of the foregoing methods, the method includes increasing engine braking during the adjusting by selectively applying torque to a driver side wheel of an all-wheel drive vehicle, a passenger side wheel of an all-wheel drive vehicle, or both.

In a further non-limiting embodiment of any of the foregoing methods, the method includes detecting the target deceleration prior to the adjusting.

In a further non-limiting embodiment of any of the foregoing methods, during the detecting, the target deceleration is inferred from a comparison of an actual brake pedal tip out rate to a historical brake pedal tip out rate and corresponding decelerations of the vehicle.

In a further non-limiting embodiment of any of the foregoing methods, during the detecting, the deceleration is inferred from a reading provided by a sensor.

In a further non-limiting embodiment of any of the foregoing methods, the method includes heating a passenger cabin of the vehicle using at least some of the amount of thermal energy from engine braking.

In a further non-limiting embodiment of any of the foregoing methods, the method includes heating at least one powertrain component of the vehicle using at least some of the amount of thermal energy from engine braking.

In a further non-limiting embodiment of any of the foregoing methods, the method includes heating an electronically controlled transmission using at least some of the amount of thermal energy from the engine braking.

In a further non-limiting embodiment of any of the foregoing methods, the vehicle is an electrified vehicle.

An assembly according to an exemplary aspect of the present disclosure includes, among other things, a friction brake to selectively provide friction braking to a vehicle, an engine brake to selectively provide engine braking to the vehicle, and a controller configured to adjust a proportion of the engine braking used to achieve a target deceleration of the vehicle to change an amount of thermal energy generated from engine braking.

In another example of the foregoing assembly, the assembly includes a deceleration sensing assembly. The controller is configured to detect an upcoming deceleration based on information from the deceleration sensing assembly.

In another example of the foregoing assembly, the assembly includes a brake pedal. The controller is configured to detect an upcoming deceleration based on an actuation of the brake pedal.

In another example of the foregoing assembly, the assembly includes a clutch. The controller is configured to slip the clutch during the adjusting to increase thermal energy in axle components of the vehicle.

In another example of the foregoing assembly, the controller is configured to increase a proportion of the engine braking to increase the amount of thermal energy.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Friction braking, engine braking, or both can decelerate a vehicle. This disclosure relates to selectively adjusting a proportion of engine braking used to achieve a target deceleration. Adjusting the proportion of engine braking can change the amount of thermal energy generated from engine braking.

In some examples, the proportion of engine braking used during a deceleration can be selectively increased to increase thermal energy generated from engine braking. The thermal energy can then be used to, among other things, heat powertrain components, which can reduce friction and improve overall fuel economy.

Figure 1:
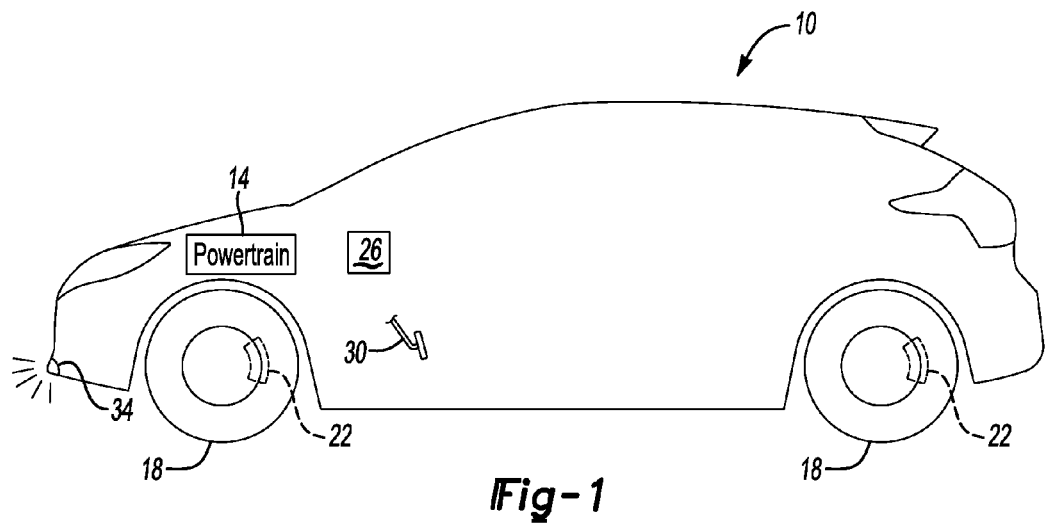
FIG. 1 illustrates a partially schematic view of an example vehicle.
Figure 2:
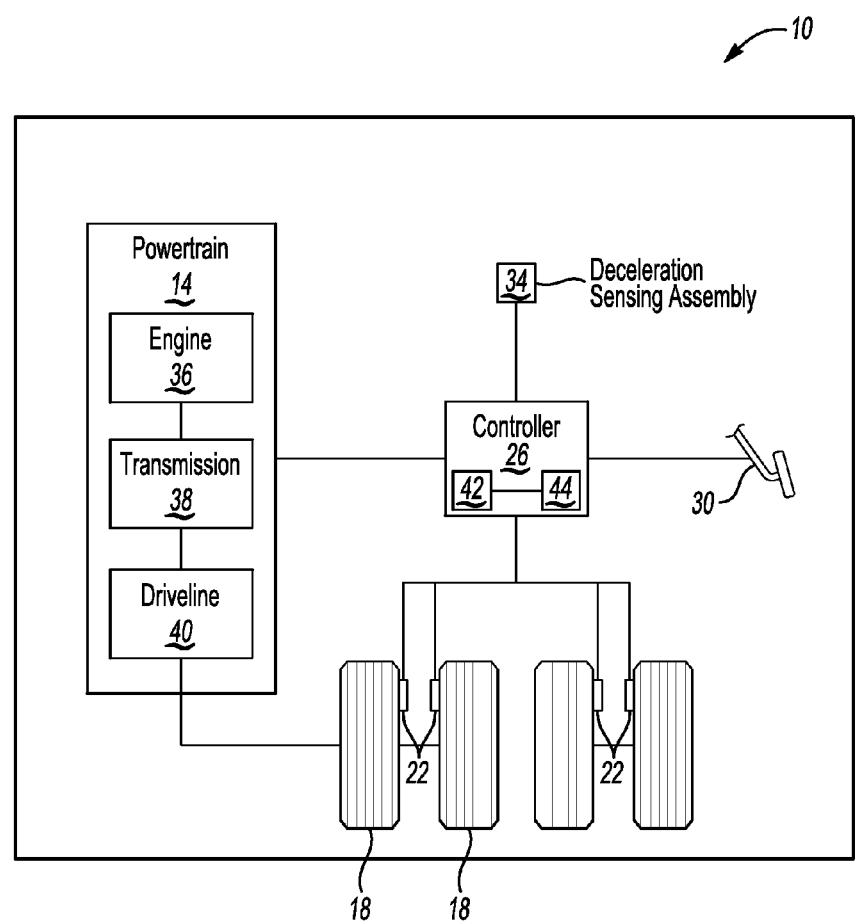
FIG. 2 illustrates a highly schematic view of the vehicle of FIG. 1.

Referring to FIGS. 1 and 2, an example vehicle 10 includes a powertrain 14, a plurality of wheels 18, a plurality of friction brakes 22, a controller 26, a brake pedal 30, and a deceleration sensing assembly 34. One of the friction brakes 22 is associated with each of the wheels 18.

The powertrain 14 includes, but is not limited to, an internal combustion engine 36, a transmission 38, and at least a portion of a driveline 40.

The example vehicle 10 is an electrified vehicle that is selectively driven using a battery-powered electric machine (not shown). The battery powered electric machine can drive the vehicle 10 instead of, or in addition to, the engine 36. Example electrified vehicles include hybrid electric vehicles (HEVs), plug-in hybrid electric vehicles (PHEVs), fuel cell vehicles (FCVs), and battery electric vehicles (BEVs).

The vehicle 10 could be a conventional motor vehicle in another example. Conventional motor vehicles, in contrast to electrified vehicles, are driven exclusively using an internal combustion engine.

The powertrain 14, the battery-powered electric machine, or both drive at least some of the wheels 18 to accelerate the vehicle. The powertrain 14 can apply an engine brake torque to decelerate the vehicle 10. The engine brake torque resists movement of the wheels 18, which decelerates the wheels 18 and the vehicle 10. Thermal energy is generated due to the application of the engine brake torque during engine braking.

The friction of powertrain components, including for example, friction of engine piston to cylinder, viscous shear of transmission fluid and driveline fluid can generate thermal energy during engine braking. Generally, the heat generated is a function of the torque and speed of the event, e.g., a higher engine speed creates more frictional heat.

The friction brakes 22 can each apply a friction brake torque to a respective one of the wheels 18. The application of the friction brake torque can decelerate the vehicle 10. The application of friction brake torque can generate thermal energy near the friction brakes 22 and the wheels 18 due to friction.

A total brake torque to decelerate the vehicle 10 can include at least some engine brake torque and at least some friction brake torque.

The controller 26 is operably coupled to components of the vehicle 10. In this example, the controller 26 is operably coupled to the powertrain 14, the wheels 18, the friction brakes 22, the brake pedal 30, and a deceleration sensing assembly 34. The controller 26 can be operable coupled to more or fewer components in other examples.

The controller 26 is operably coupled to the powertrain 14 such that the controller 26 can adjust the gearing of the powertrain 14 between a higher gear ratio and a lower gear ratio. When the vehicle 10 is decelerating and the powertrain 14 is in a higher gear ratio, the powertrain 14 generates less thermal energy due to engine brake torque than when the vehicle 10 is decelerating and the powertrain 14 is in a lower gear ratio.

In this example, the controller 26 adjusts the powertrain 14 between higher gear ratios and lower gear ratios to adjust a proportion of engine brake torque used to achieve a target deceleration of the vehicle 10. Under some operating conditions, the controller 26 adjusts the powertrain 14 to change an amount of thermal energy generated due to engine brake torque.

Notably, when downshifting the powertrain 14, the friction power of the powertrain 14 increases and oil flow through the crank-driven transaxle oil pump can increase. Spin-lost testing of the transaxle has shown that this has caused significant temperature increases to oil within the transaxle due to oil sheer.

The controller 26 can make other adjustments to the powertrain 14 to change the amount of engine brake torque including, but not limited to, throttle adjustments, cam adjustments, and deceleration-fuel-shut-off.

Thermal energy from the engine brake torque can be used to heat components of the powertrain 14 and other components of the vehicle 10. In particular, thermal energy from application of the engine brake torque can heat components of the driveline 40. Heating components can reduce friction and can improve fuel economy.

In some examples, thermal energy from engine braking can be used to provide more heat to a passenger cabin of the vehicle 10. The thermal energy may, for example, be transferred to an engine coolant that is circulated through a conditioning assembly for the passenger compartment.

Notably, operating the powertrain 14 at a relatively high gear ratio can cause disturbances or unexpected deceleration rates for a customer. The controller 26 can adjust the response to the braking request to adjust the braking if the customer finds the disturbances or unexpected deceleration rates objectionable at a relatively high gear ratio.

The example controller 26 includes a processor 42 operatively linked to a memory portion 44. The example processor 42 is programmed to execute a program stored in the memory portion 44. The program may be stored in the memory portion 44 as software code.

The program stored in the memory portion 44 may include one or more additional or separate programs, each of which includes an ordered listing of executable instructions for implementing logical functions. The instructions enable the controller 26 to adjust the powertrain 14 to change the proportion of engine braking use to achieve a desired deceleration.

Figure 3:
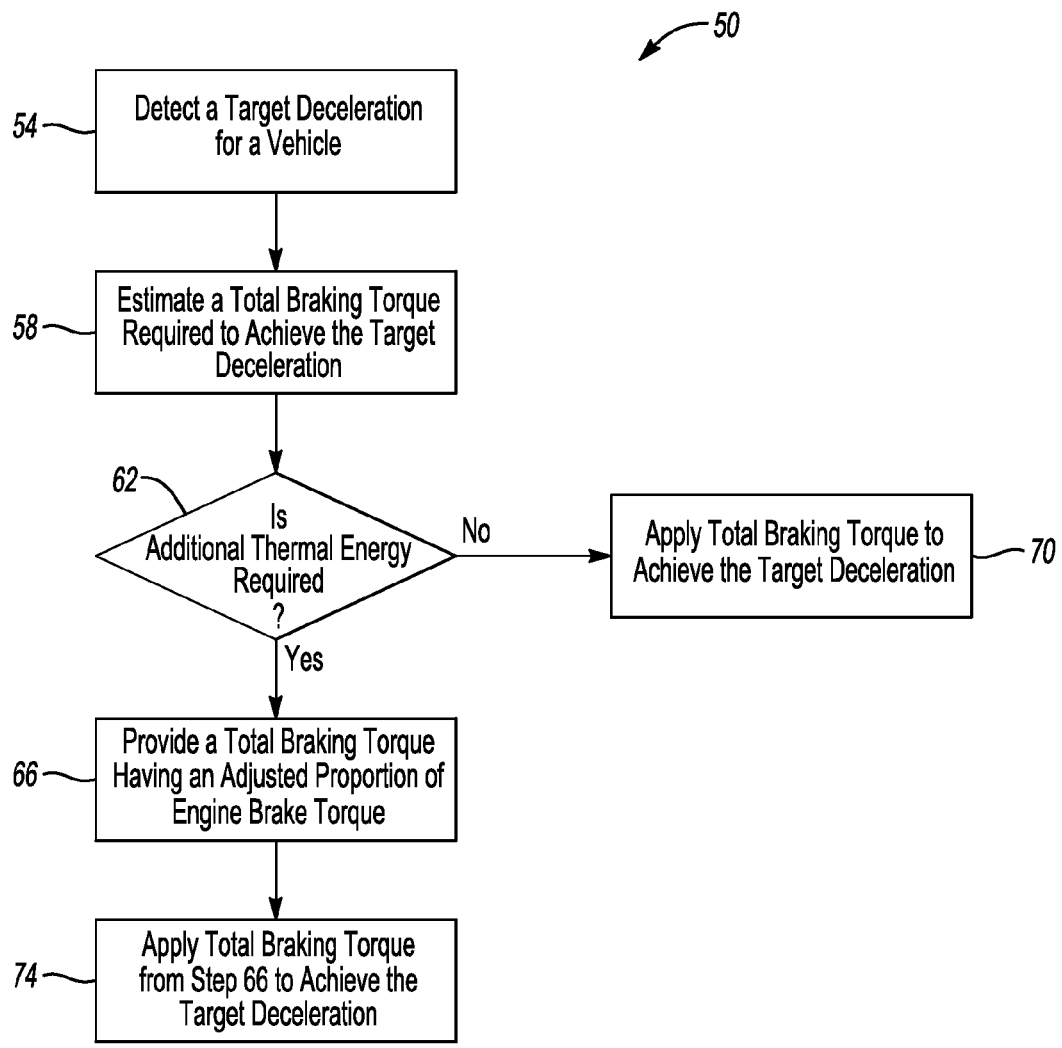
FIG. 3 illustrates an example method for adjusting a proportion of engine braking.

Referring now to FIG. 3 with continuing reference to FIGS. 1 and 2, an example method 50 of adjusting a proportion of engine braking in a total brake torque includes a step 54 of detecting a target deceleration for the vehicle 10. In one example, the target deceleration could be determined from the brake pedal position, where the target deceleration is a function of brake pedal position and vehicle speed.

In one example, a driver's actuation of the brake pedal 30 at a particular tip-out rate can indicate to the controller 26 that the vehicle 10 will be decelerated. The controller 26 can then, for example, link to the memory portion 44, which can store historical brake pedal tip out rates and corresponding deceleration information.

Armed with information from the memory portion 44, a program is executed on the controller 26. The program compares a tip-out rate of the brake pedal 30 to a historical brake pedal tip out rate and corresponding deceleration for the vehicle 10. Based on the comparison, the controller 26 can predict a target deceleration and, at a step 58, estimate a total braking torque required to achieve at the target deceleration.

The target deceleration is inferred from the comparison. For example, if the controller 26 finds from the memory portion 44 that a brake pedal tip out rate of 5 degrees per second has historically been used within the vehicle 10 to cause a deceleration of 0.25 g's, the controller 26 can infer that a brake pedal tip out rate of 5 degrees per second corresponds to a target deceleration of 0.25 g's.

The controller 26 could further infer the target deceleration from a pedal tip out rate at a particular location. That is, the controller 26, in some examples, infers a first target deceleration for a brake pedal tip out rate of 5 degrees per second at a first location. The controller 26 then infers a second, different target deceleration for a brake pedal tip out rate of 5 degrees per second when the vehicle 10 is at a second location that is different than the first location. The controller 26 can determine the location of the vehicle 10 when the brake pedal tip out rate is applied using a Global Positioning System, for example.

Other examples of detecting a target deceleration for the vehicle 10 can be used and would fall within the scope of this disclosure. For example, the deceleration sensing assembly 34 could be used in some examples. The deceleration sensing assembly 34 can include a sensor to detect that an upcoming stop is required, even before the driver actuates the brake pedal 30. Sensing information collected by the deceleration sensing assembly 34 could be based on Global Positioning System information, vehicle-to-vehicle communication information, vehicle-to-infrastructure communication information, (such as traffic lights sending a signal out to approaching vehicles), adaptive cruise information, or autonomous information.

After estimating the total braking torque required in the step 58, the method 50 calculates whether additional thermal energy is required for the vehicle 10 at a step 62. The controller 26 may calculate that additional thermal energy is required at the step 62 when the vehicle 10 is early in a drive cycle in a relatively cold environment and, for example, components of the powertrain 14 have not reached an optimal operating temperature. Temperature sensors can be used to evaluate a temperature of components of the powertrain 14 and other components of the vehicle 10.

In this example, if the components of the powertrain 14 are below the optimal operating temperature, the method 50 determines at the step 62 that additional thermal energy is required. The method then moves to a step 66. If, at the step 62, the controller 26 determines that thermal energy is not required, the method 50 moves to the step 70.

At the step 70, total braking torque is applied to the vehicle 10 to achieve the target deceleration. Some proportion of the total braking torque is an engine brake torque. In the step 70, the proportion of engine brake torque has not been adjusted by the controller 26 to change an amount of thermal energy because additional thermal energy is not required.

If, at the step 62, additional thermal energy is required, the controller 26 adjusts the proportion of engine brake torque within the total braking torque at the step 66. In this example, the controller 26 increases the proportion of engine brake torque within the total braking torque. The controller 26 thus provides a total braking torque that has an adjusted proportion of engine brake torque.

The controller 26, in this example, adjusts the proportion of engine braking at the step 66 to increase the thermal energy due to engine braking. The controller 26 can, for example, downshift the transmission in 14 to a lower gear ratio to increase a proportion of engine braking used to achieve a total braking torque.

As can be appreciated, when the engine braking is increased, the friction braking is decreased so that the total braking torque remains the same and the target deceleration is achieved. After the engine brake torque is adjusted, the required friction braking torque can be calculated by subtracting the proportion of engine braking from a total braking torque required to achieve the target deceleration.

At a step 74, the method 50 applies the adjusted total braking torque from the step 66 to cause the vehicle 10 to achieve the target deceleration.

In some examples, the engine 36 of the powertrain 14 could be a continuously variable transmission type engine. In such situations, the controller 26 may adjust the engine speed without downshifting to adjust a proportion of engine braking used to provide the adjusted total braking torque.

The controller 26 can calculate the benefit to additional thermal energy from engine braking and to fuel economy enhancements due to increased engine coolant temperatures. In some examples, such as when the vehicle 10 is a hybrid vehicle, the controller 26 may calculate that increasing temperature of engine coolants to temperatures even above the optimal coolant operating range may be beneficial to enable longer electrified vehicle operation before the engine 36 is required to restart due to decreasing engine coolant temperatures.

The controller 26 can further evaluate the engine brake torque required and evaluate if the efficiency of the powertrain 14 can be improved by increased oil and coolant temperature to reduce friction; increased engine coolant temperature to increase heat performance and cabin warm-up; and increased transmission oil temperature to reduce friction. Further, the controller 26 can evaluate if increased engine braking would enable some or all of the fuel injectors to be turned off (deceleration fuel shut-off) to improve fuel economy directly.

In some examples, the vehicle 10 is an all-wheel drive vehicle. If the engine braking torque would approach a slip limit of the wheels 18 when the all-wheel drive vehicle is operating in a two-wheel drive mode, the controller 26 may cause the vehicle 10 to move to an all-wheel drive mode to provide an increased opportunity for engine braking. In some examples, the controller 26 may further slip the clutch of the all-wheel drive vehicle to warm proximate components, such as axle or transfer case components.

In some examples, when the vehicle 10 is an all-wheel drive vehicle, the controller 26 may selectively engage or apply torque to a driver side wheel, a passenger side wheel, or both to create more engine braking capacity for the vehicle 10.

In some examples of the vehicle 10, the shafts that engage to provide the all-wheel drive functionality may disconnect and then reengage when more engine braking is required.

Features of the disclosed examples include an improved fuel economy for conditions where engine coolant or engine oil temperatures are less than an optimal temperature operating range, such as less than 200° F. The vehicle 10 in some examples may take more than thirty minutes to reach an operating temperature where the engine coolants and engine oil are operating within the optimal operating temperature range. Thus, the method of adjusting a proportion of engine braking may be most appropriately utilized within the first thirty minutes of a drive.

Another feature of the disclosed examples includes the ability to adjust a proportion of engine braking to generate thermal energy that is utilized to heat a passenger cabin of the vehicle 10. Notably, without the specialized controller of the vehicle 10, prior art designs were not capable of providing the adjustability to the proportion of engine braking because the customer's actuation of the brake pedal 30 controlled the friction brakes at a desired rate.

The teachings of this disclosure may be particularly appropriate to autonomous vehicles or adaptive cruise type vehicles. For autonomous vehicles, the engine speed and noise increases due to increasing a proportion of engine braking would not necessarily be alarming to passengers because the passengers are not operating the pedal or necessarily paying close attention to the operation of the vehicle. These customers may accept the increased speed and noise due to the increase proportion of engine braking used to achieve a target deceleration.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
   detecting a target deceleration of a vehicle using a component of the vehicle; and
   adjusting, using a controller, a proportion of engine braking used to achieve the target deceleration in order to change an amount of thermal energy generated from engine braking.

2. The method of claim 1, wherein the adjusting increases the proportion of engine braking used to achieve the target deceleration.

3. The method of claim 1, further comprising decreasing a proportion of friction braking during the adjusting.

4. The method of claim 1, further comprising increasing the engine braking during the adjusting by adjusting a transmission gear ratio.

5. The method of claim 1, further comprising increasing the engine braking during the adjusting by moving to an all-wheel drive mode of the vehicle.

6. The method of claim 5, further comprising slipping a clutch during the adjusting to increase thermal energy in axle components of the vehicle.

7. The method of claim 1, further comprising increasing engine braking during the adjusting by selectively applying torque to a driver side wheel of an all-wheel drive vehicle, a passenger side wheel of an all-wheel drive vehicle, or both.

8. A method, comprising:
   adjusting a proportion of engine braking used to achieve a target deceleration of a vehicle in order to change an amount of thermal energy generated from engine braking; and
   detecting the target deceleration prior to the adjusting, the target deceleration inferred from a comparison of an actual brake pedal tip out rate to a historical brake pedal tip out rate and corresponding decelerations of the vehicle.

9. The method of claim 8, wherein the target deceleration is inferred during the detecting.

10. The method of claim 8, wherein, during the detecting, the deceleration is inferred from a sensor.

11. The method of claim 1, further comprising heating a passenger cabin of the vehicle using at least some of the amount of thermal energy from engine braking.

12. The method of claim 1, further comprising heating at least one powertrain component of the vehicle using at least some of the amount of thermal energy from engine braking.

13. The method of claim 1, further comprising heating an electronically controlled transmission using at least some of the amount of thermal energy from the engine braking.

14. The method of claim 9, wherein the vehicle is an electrified vehicle.

15. An assembly, comprising:
    a friction brake to selectively provide friction braking to a vehicle;
    an engine brake to selectively provide engine braking to the vehicle; and
    a controller configured to adjust a proportion of the engine braking used to achieve a target deceleration of the vehicle in order to change an amount of thermal energy generated from engine braking.

16. The assembly of claim 15, further comprising a deceleration sensing assembly, the controller configured to detect an upcoming deceleration based on information from the deceleration sensing assembly.

17. The assembly of claim 15, further comprising a brake pedal, the controller configured to detect an upcoming deceleration based on an actuation of the brake pedal.

18. The assembly of claim 15, further comprising a clutch, wherein the controller is configured to slip the clutch during the adjusting to increase thermal energy in axle components of the vehicle.

19. The assembly of claim 15, wherein the controller is configured to increase a proportion of the engine braking to increase the amount of thermal energy.

20. The method of claim 1, further comprising detecting based on a comparison of an actual brake pedal tip out rate to a historical brake pedal tip out rate and corresponding decelerations of the vehicle.

21. The method of claim 1, further comprising detecting based on information from a deceleration sensing assembly of the vehicle.

* * * * *